Figure 1:
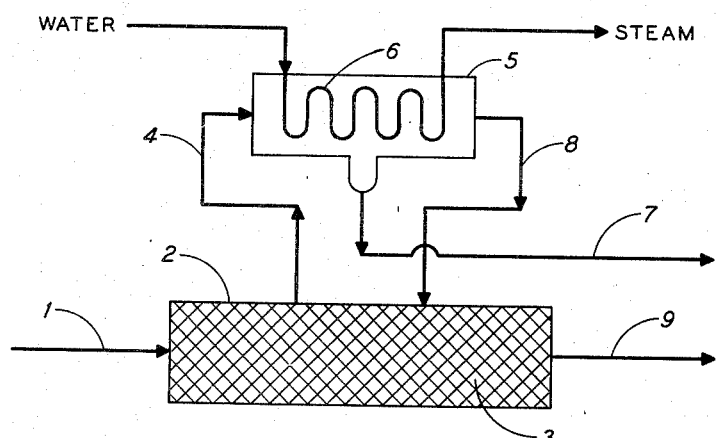

Dec. 24, 1957     C. S. SMITH, JR     2,817,416
LIQUID PHTHALIC ANHYDRIDE RECOVERY
Filed Jan. 28, 1954     2 Sheets-Sheet 1

INVENTOR
CALVIN S. SMITH, JR.
BY
ATTORNEYS

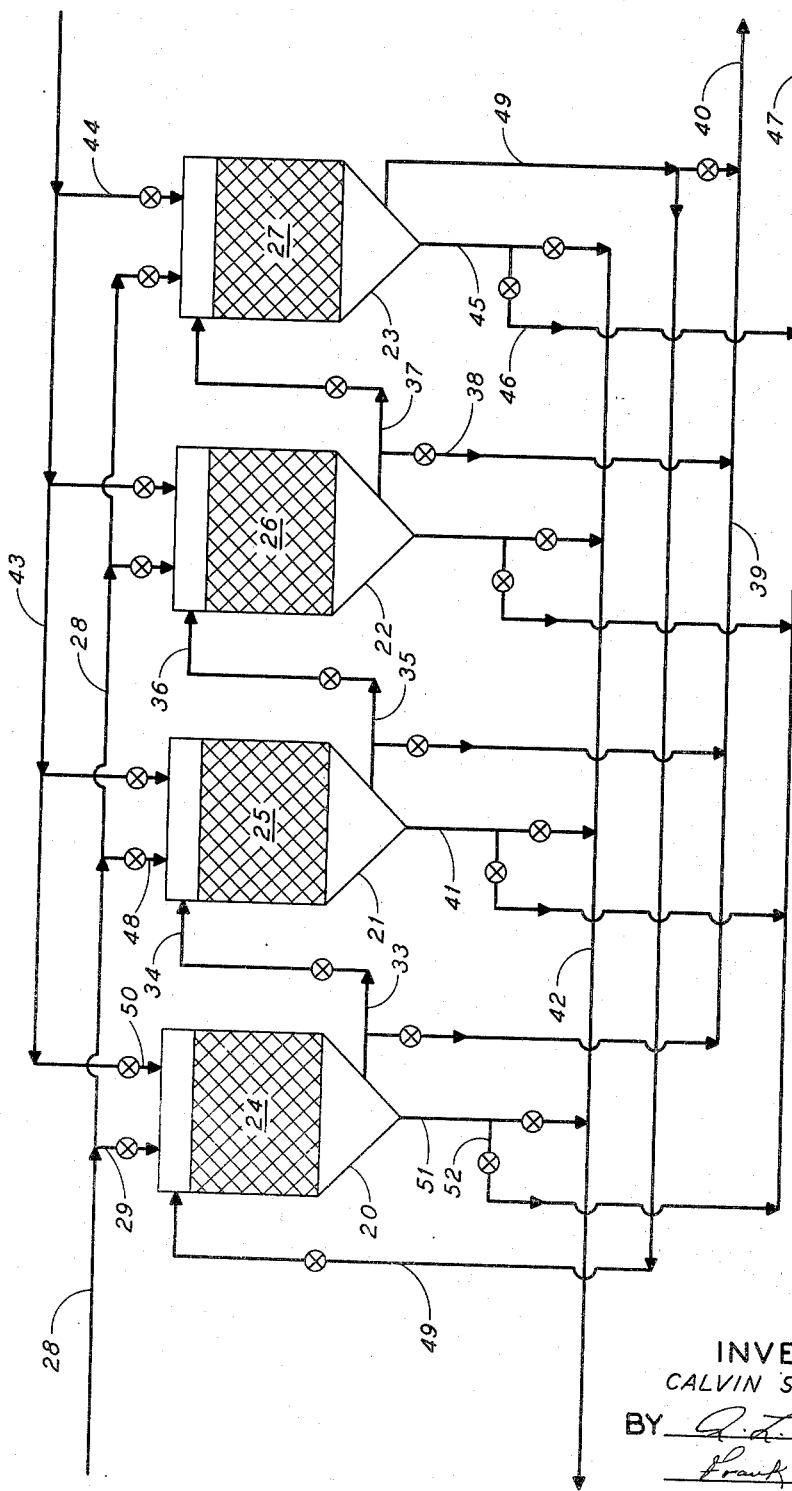

United States Patent Office 2,817,416
Patented Dec. 24, 1957

2,817,416

LIQUID PHTHALIC ANHYDRIDE RECOVERY

Calvin S. Smith, Jr., El Cerrito, Calif., assignor to California Research Corporation, San Francisco, Calif., a corporation of Delaware Application January 28, 1954, Serial No. 406,638

9 Claims. (Cl. 183—119)

This invention relates to a process for recovering phthalic anhydride from the reaction mixtures produced during vapor phase oxidation of hydrocarbons to produce phthalic anhydride. More particularly, the invention relates to a method for recovering molten phthalic anhydride from reaction product mixtures in which all or a substantial portion of the phthalic anhydride remains vaporized and uncondensed in the gas at the melting temperature of phthalic anhydride, and from mixtures in which the partial pressure of phthalic anhydride vapor is less than the vapor pressure of phthalic anhydride in equilibrium with molten phthalic anhydride at its melting point.

Commercial processes for the production of phthalic anhydride by vapor phase oxidation of phthalic anhydride convertible hydrocarbons such as naphthalenes, phenanthrenes, ortho-dialkyl benzenes, indenes, and the like, are characterized by the employment of high air-hydrocarbon ratios in the air-hydrocarbon mixture introduced into the reactors. The oxidation is accomplished by contacting the hydrocarbon in vapor phase in the presence of a stoichiometric excess of an oxygen-containing gas with a vanadium oxide catalyst at temperatures in the range from about 600° F. to about 1175° F. In the usual commercial practice, reaction temperatures from about 800° F. to 1050° F. were found to be satisfactory. Thirteen to forty parts by weight of air to one part by weight of hydrocarbon are commonly charged to the oxidation reactor. The employment of such high air-hydrocarbon ratios in the process is necessary in order to avoid conditions of composition and temperature which produce explosions in the reactors and/or reduce yields of the primary product or increase yields of undesirable by-products. Because of the high air-hydrocarbon ratios characterizing the charge to the oxidation reactors, the reaction mixture produced has a low phthalic anhydride content. The content of phthalic anhydride in the reaction product produced in most commercial vapor phase hydrocarbon oxidations is so low that, upon cooling the reaction product mixture, either all or the greater part of the phthalic anhydride which is condensed from the reaction mixture appears in solid form. Economic recovery of phthalic anhydride from such lean reaction mixtures at high yields is difficult to achieve.

A number of methods have been proposed for recovering phthalic anhydride from the reaction product mixture produced in vapor phase oxidation of phthalic anhydride. The most widely used method of making commercial recovery of phthalic anhydride from such mixtures is that of passing the reaction product mixture into a large chamber commonly referred to as a "haybarn." As the reaction product mixtures cool, the phthalic anhydride crystals condense and settle on the interior of the chamber. Phthalic anhydride is also recovered by passing the reaction mixture through a tubular heat exchanger to effect condensation of solid phthalic anhydride. The cooling liquid is brought into indirect heat exchange with the reaction product, causing solid phthalic anhydride to condense in the exchanger. Such exchangers are ordinarily employed in parallel flow so that one exchanger may be on stream to the reaction product mixture, while phthalic anhydride is being removed from the other usually by passing steam through the exchanger to melt the phthalic anhydride, which is then removed in liquid form. Phthalic anhydride has also been recovered from commercial reaction product mixtures by subjecting the reaction mixture to water scrubbing, which removes the phthalic anhydride from it. The employment of this method results in the production of a slurry of phthalic acid which is filtered to recover solid phthalic acid as the filter cake.

The solid phthalic anhydride recovered by any of the above methods is then subjected to a purification treatment which ordinarily involves two steps: digestion of the whole crude phthalic anhydride at elevated temperature for a period of 24 to 100 hours, and distillation of the digested crude phthalic anhydride.

It is an object of this invention to provide a method for recovering phthalic anhydride from the reaction product mixture produced in the vapor phase oxidation of hydrocarbons to phthalic anhydride by which a high yield of the total phthalic anhydride content of the reaction mixture is recovered.

It is the further object of this invention to provide a method for recovering phthalic anhydride in a liquid phase from gaseous reaction product mixtures containing phthalic anhydride which, upon cooling, normally deposit solid phthalic anhydride, thereby avoiding solids handling.

Other and further objects of the invention will be apparent in the following description.

Pursuant to this invention, liquid phthalic anhydride is recovered from the reaction product of vapor phase oxidation of hydrocarbons oxidizable to phthalic anhydride, which reaction product normally deposits phthalic anhydride in a solid phase, upon cooling, by passing the reaction product through a fixed mass of cool, high-melting solid heat exchange material. The only pressure requirement in the process is that the pressure difference between the point at which the reaction mixture is introduced into the heat exchange material and the point at which phthalic anhydride-free gas is withdrawn from the system shall exceed the pressure drop through the mass or masses between these points. In the usual operation of processes for vapor phase oxidation of hydrocarbons to phthalic anhydride, the reaction product mixture flows from the oxidation reactor at a pressure of about 1 to 4 pounds per square inch gauge. In this invention, a small increase in pressure sufficient to cause passage of the gaseous mixture through the mass of heat exchange material may be required. The liquid phthalic anhydride produced by the process of the invention may be formed entirely within the body of the heat exchange mass and the molten phthalic anhydride product withdrawn therefrom, or a side-stream of the reaction product mixture enriched in phthalic anhydride vapor is withdrawn from the heat exchange mass at a temperature above its phthalic anhydride dew point and cooled to condensed liquid phthalic anhydride in a conventional heat exchanger extrinsic to the heat exchange mass. The uncondensed gas effluent from this extrinsic heat exchanger can be returned to the heat exchange mass.

Figure 3:
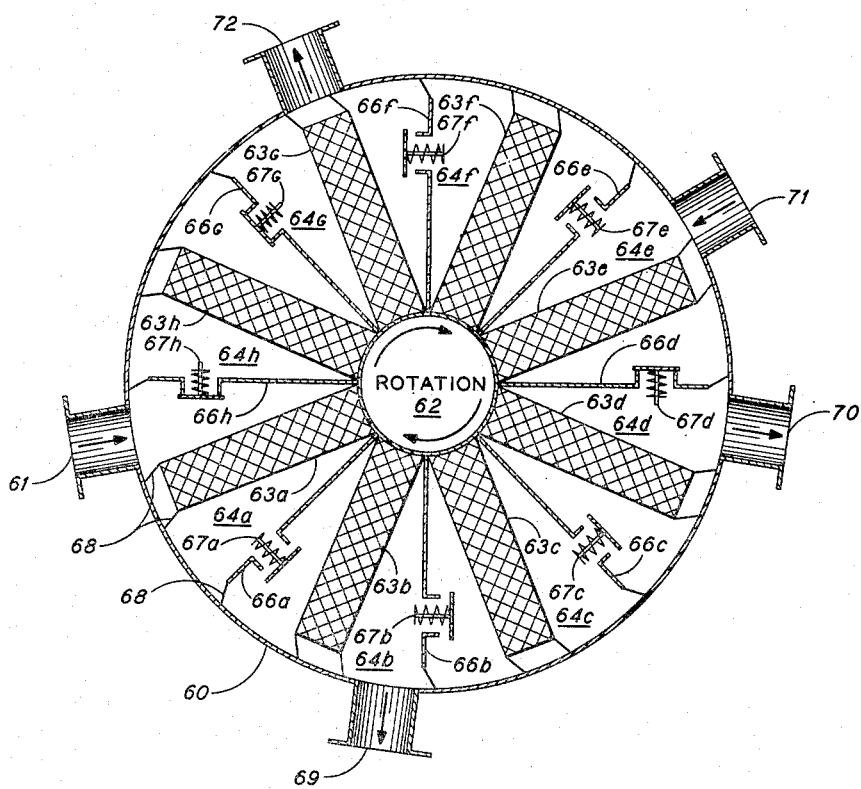

The invention may be better understood by reference to the appended drawings, of which Figure 1 is a diagrammatic illustration of a modification of the process of the invention in which molten phthalic anhydride is recovered in a heat exchanger extrinsic to a single fixed mass of heat exchange material through which the reaction product mixture passes. Figure 2 illustrates a further modification of the invention in which liquid phthalic anhydride is directly removed from one of a group of serially connected fixed beds of heat exchange material which constitute a liquid phthalic anhydride recovery zone at the same time one or more fixed masses of the same type are undergoing cooling in a cooling zone. Figure 3 is a diagrammatic illustration of still a further modification of the process of the invention in which liquid phthalic anhydride is produced in a fixed cylindrical recovery zone by countercurrent contact of the reaction product mixture with rotating masses of solid heat exchange material and withdrawn from the said zone.

Referring now to Figure 1: A reaction product mixture effluent from an oxidation reactor in which hydrocarbons, such as naphthalene, ortho-dialkyl benzenes, phenanthrene, and the like, are oxidized by an oxygen-containing gas, usually air, in contact with a catalyst, such as vanadium oxide, to produce a lean phthalic anhydride reaction mixture is introduced by line 1 into chamber 2, the latter containing a mass 3 of high-melting solid heat exchange material, at a pressure sufficient to cause flow of the gas through the mass. The reaction product mixture from the oxidation reactor is introduced into chamber 2 at a temperature above that at which phthalic anhydride is condensed from the gas, usually at 400° F. to 800° F., but within the range of about 270° F. to 1000° F.

The mass 3 is composed of an insert, non-porous, high-melting solid heat exchange material with a large surface area, high heat capacity, and free of internal adsorptive area. The heat exchange material is preferably granular, sized in the range from 1 to 5 mesh, i. e., from 1 inch in diameter of ⅕ inch in diameter, and of material such as quartz chips, granite pebbles, metal spheres, etc. However, any heat exchange medium that meets the above requirements can be employed, even though differing in physical dimensions as to size. Examples of the latter are metal screens, honey-combed metal structures, etc.

The manner in which liquid phthalic anhydride is recovered from the reaction product mixture, which normally deposits solid phthalic anhydride upon cooling as accomplished by the process of this invention, is best shown by indicating the conditions within the mass 3 at the startup of the process. The mass 3 is initially cool, i. e., at atmospheric temperature or at least below about 150° F. The gaseous reaction product mixture from the oxidation reactor passes through mass 3 and is cooled during this passage. The first phthalic anhydride to be condensed from the mixture is solid phthalic anhydride, which condenses upon the heat exchange material at a point near the point of introduction of the reaction mixture by line 1. As the reaction mixture passes through mass 3, a temperature gradient is established in the mass, ranging from approximately reaction mixture temperature at the point of introduction to the mass and decreasing to the initial temperature of the mass further downstream. As the temperature increases progressively through mass 3, the solid phthalic anhydride initially formed sublimes, with the net effect that the flowing reaction product mixture is enriched in respect to its phthalic anhydride content. This enrichment continues until the phthalic anhydride dew point of the enriched reaction product mixture is above the melting point of phthalic anhydride, at which condition cooling below the dew point causes condensation of phthalic anhydride in a liquid phase. A portion of this enriched vapor is withdrawn from chamber 2 through line 4 from a point in the mass at which the temperature of the gases is in the range 300° F. to 350° F. and above the phthalic anhydride dew point of the enriched reaction product mixture. The gas withdrawn from chamber 2 through line 4 is passed into tubular heat exchanger 5, where it is cooled to a temperature below its phthalic anhydride dew point, but above the melting point of phthalic anhydride, to effect condensation of liquid phthalic anhydride. A cooling medium, usually water, is circulated through tube 6 of the exchanger 5 so as to effect this condensation. Liquid phthalic anhydride accumulates in the shell of heat exchanger 5 and is withdrawn from the exchanger 5 through line 7 and passed to storage or purification facilities. Uncondensed gases are removed from heat exchanger 5 through line 8 and returned to chamber 2, being introduced to chamber 2 at a point in the chamber downstream from the point of withdrawal of enriched gas. The gases re-introduced into chamber 2 through line 8, and gases which had previously been introduced through line 1 and not withdrawn through line 4, pass through the mass 3 contacting progressively cooler portions of the mass to effect condensation of residual phthalic anhydride contained in the gases in the form of phthalic anhydride crystals. The fixed gases contained in the reaction mixture are removed from chamber 2 through line 9 substantially completely free of phthalic anhydride. The gaseous effluent from chamber 2 through line 9 may be water scrubbed for the removal of minor amounts of low-boiling organic material, including by-product maleic anhydride, prior to their release to the atmosphere. Introduction of the reacton mixture is continued only until there is established a temperature gradient through mass 3 such that the temperature of the mass adjacent the point of introduction of the gaseous reaction mixture into chamber 2 through line 1, is approximately equal to the temperature of the reaction mixture, and the temperature at the extremity of mass 3 where the phthalic anhydride-free effluent is removed from chamber 2 through line 9 is close to but less than the temperature at which crystalline phthalic anhydride will condense out of the reaction mixture, i. e., about 100° F.

When this condition is reached, the mass of heat exchange material is not completely exhausted in respect to its capacity to condense phthalic anhydride from the gas mixture. The downstream extremity of the mass of heat exchange material is at a temperature of about 100° F. and has a residue of cooling capacity. At this point in the process, introduction of the gas mixture through line 1 is discontinued and a cooling gas, for example, air, is passed into the mass through line 1. The cooling gas cools the upstream portion of the mass and is itself heated. As the cooling gas traverses the mass of heat exchange material, it picks up a small content of phthalic anhydride vapor and this vapor is deposited as solid phthalic anhydride in the downstream extremity of the bed so that no loss of phthalic anhydride is incurred during the cooling step. Passage of cooling gas through the mass of heat exchange material is continued until the entire mass is cooled to about 100° F. When this point is reached, introduction of the cooling gas is discontinued and feed is introduced into the mass through line 9 so that it traverses the mass of heat exchange material in a direction opposite from the direction of feed flow in the first-described feed contacting step. The hot feed entering the mass of heat exchange material through line 9 undergoes enrichment in respect to phthalic anhydride content by first depositing solid phthalic anhydride on the portion of the mass adjacent the inlet from line 9 and subsequently vaporizing this solid phthalic anhydride to produce phthalic anhydride-rich vapor in the intermediate portion of the mass, which is withdrawn and cooled to condense liquid phthalic anhydride as above described. Introduction of the gas mixture into the mass through line 9 and passage through the mass are continued until a temperature gradient ranging from approximately the temperature of the feed adjacent the inlet from line 9 to about 100° F. adjacent the outlet through line 1 is established in the mass. When this point is reached, feed introduction through line 9 is discontinued, and cooling gas is passed into the mass through line 9 and its passage continued until the mass is cooled to about 100° F. Operation in this manner may be regarded as a four-step cyclic operation. In step 1, feed is introduced through line 1 until the above-described temperature gradient is established; in step 2, cooling gas is introduced into line 1 until the mass is cooled to about 100° F.; in step 3, feed is introduced through line 9 until the described temperature gradient is established; and in step 4, cooling gas is passed into the mass through line 9 until the mass is cooled to about 100° F. Successive cycles are simply repetition of these four steps. In continuous operation it is obviously desirable to have two or more masses of granular heat exchange material corresponding to mass 3 of Figure 1, so that one mass may be effecting condensation of phthalic anhydride while the other is being cooled. Piping and valving can be arranged by those skilled in the art so that a single condenser, corresponding to condenser 5, receives phthalic anhydride-rich vapors from either of the masses.

Pursuant to a modification as to the operation of the process indicated in Figure 1, liquid phthalic anhydride is formed in and is directly removed from chamber 2. The draw-off line is located at the point in mass 3 where a liquid phase of phthalic anhydride is formed. In other words, line 4, heat exchanger 5, and lines 7 and 8 are omitted and liquid phthalic anhydride is recovered directly from mass 3.

Figure 2 of the appended drawings illustrates a further modification of the process of the invention by which liquid phthalic anhydride is recovered by the employment of a plurality of fixed beds of heat exchange material disposed in two zones: a liquid phthalic anhydride recovery zone and a cooling zone. The liquid phthalic anhydride recovery zone is composed of chambers 20, 21, and 22, containing, respectively, masses 24, 25, and 26 of high-melting solid granular heat exchange material of preferably 1 to 5 mesh. The reaction product mixture from the oxidation reactor is introduced into chamber 20, the first terminal fixed bed of the liquid phthalic anhydride recovery zone of this cycle, through manifold line 28 and line 29 at a temperature within the range above about 400° F., and at a pressure sufficient to pass the mixture through masses 24, 25, and 26, constituting the liquid phthalic anhydride recovery zone. The reaction mixture flow through the liquid phthalic anhydride recovery zone is as follows: the mixture passes into chamber 20 by lines 28 and 29, through the mass 24, and leaves chamber 20 by line 33. It then passes into chamber 21 by line 34, through the mass 25, and leaves chamber 21 by line 35. It then passes into chamber 22, the last terminal fixed bed of the liquid phthalic anhydride recovery zone, by line 36, through the mass 26, leaves chamber 22 by lines 37, 38, and manifold line 39, from which manifold line it passes through line 40 to fume disposal facilities. During the above flow of the reaction mixture through the liquid phthalic anhydride recovery zone, liquid phthalic anhydride is removed from chamber 21 by line 41 and manifold line 42, from which the liquid phthalic anhydride is sent to storage facilities. The manner in which liquid phthalic anhydride is recovered from the reaction product mixture, which normally deposits solid phthalic anhydride upon cooling as accomplished by the process of this invention, is best shown by indicating the conditions within the liquid phthalic anhydride recovery zone during the passage of the reaction mixture through this zone. Immediately prior to the introduction of the reaction mixture, there exists in the masses 24, 25, and 26 of the recovery zone a temperature gradient within these masses due to the passage of the hot reaction mixture in the previous cycle. This temperature gradient constitutes the initial temperatures of the masses in respect to the cycle now being described. The first terminal mass of the liquid recovery zone of this cycle, mass 24, had been the second mass of the recovery zone of the previous cycle, and is at a temperature in the neighborhood of 300° F. at its outlet. The second mass, 25, of this cycle is at a temperature close to but less than the temperature at which crystalline phthalic anhydride will condense out of the reaction mixture, i. e., about 150° F. at its outlet. The third and last terminal mass of the liquid recovery zone, mass 26, as here described, in the previous cycle had been the first terminal bed of the cooling zone, is at a temperature below about 100° F. These temperatures represent the initial temperatures of the three masses, or beds, that represent the liquid phthalic anhydride recovery zone of this cycle. Gradient temperatures exist within masses 24 and 25 approximately as follows:

| | ° F. |
|---|---|
| Inlet, 24 | 400 |
| Outlet, 24 | 275 |
| Inlet, 25 | 275 |
| Outlet, 25 | 150 |

The passage of the reaction mixture in this cycle through the three masses 24, 25, and 26 is continued until there is established the same temperature gradient as outlined in the description of the operation of Figure 1, the single fixed bed. That is, in chamber 20, the first terminal bed of the recovery zone, adjacent to the point of entry of the reaction mixture by line 29, the temperature is very nearly that of the incoming hot mixture, with the temperature progressively decreasing through masses 24, 25, and 26 until a temperature less than the melting point of phthalic anhydride (about 125–150° F.) in mass 26 adjacent the outlet 37 of the third and last terminal fixed bed 22 of the liquid phthalic anhydride recovery zone is attained. By establishing this gradient, the following occurs within the recovery zone. The hot reaction mixtures pass into mass 24 by lines 28 and 29 and contact the mass, which is at a temperature in the range 300° F. to 400° F. and which has present on the surface of the heat exchange particles a residue of liquid phthalic anhydride formed in the previous cycle. The hot reaction mixture vaporizes the liquid phthalic anhydride, thereby enriching the reaction mixture in respect to its phthalic anhydride content. This enriched reaction mixture then passes from mass 24 by lines 33 and 34 into chamber 21 and mass 25, which is at a temperature less than about 150° F. The enriched reaction mixture is cooled by the contact with the cool mass, and liquid phthalic anhydride forms in chamber 21. This phthalic anhydride liquid phase is removed from chamber 21 by line 41 and introduced into liquid phthalic anhydride manifold line 42, from which it goes to storage or purification facilities. The uncondensed reaction mixture in chamber 21 passes through lines 35 and 36 into chamber 22, the third fixed bed and, as here described, the last terminal fixed bed of the liquid phthalic anhydride recovery zone. As noted before, this mass 26 is at a temperature less than 100° F. The reaction mixture passes through mass 26, where it is cooled below the freeze point of phthalic anhydride, and substantially all of the phthalic anhydride remaining in the reaction mixture is removed therefrom and deposits on the mass 26 as crystalline phthalic anhydride. The above-described temperature gradient is therefore established, with the result that substantially all of the phthalic anhydride in the reaction mixture is removed and a liquid product of phthalic anhydride is obtained.

As here described by Figure 2, only three fixed beds or masses are employed as a liquid phthalic anhydride recovery zone, but it should be understood that the number of fixed beds constituting phthalic anhydride liquid recovery zone may be varied. The gaseous effluent from chamber 22, the last terminal of the liquid phthalic anhydride recovery zone, when the temperature gradient as described is maintained, will be substantially free of phthalic anhydride in that all or virtually all of the phthalic anhydride in the reaction mixture introduced into chamber 20 will be partly trapped in the recovery zone as solid, liquid, and vapor, and the remaining portion will have been removed as liquid phthalic anhydride. This effluent will be removed from chamber 22 by lines 37 and 38, and manifold line 39, from which manifold lines it passes through line 40 to fume disposal facilities.

The cooling zone comprises one or more fixed beds of the same construction as chambers 20, 21, and 22, and filled with the same type of heat exchange material. Figure 2 shows only one such bed, composed of chamber 23 and heat exchange mass 27, but it is understood that the cooling zone may contain a plurality of serially connected similar fixed beds. Gas or water at a temperature of about 60° F., but below 100° F., is passed through the cooling zone. As illustrated in Figure 2, mass 27 constitutes the cooling zone. The cooling medium enters chamber 23 by manifold line 43 and line 44. It passes through mass 27, cooling the mass by its passage, and its removed from chamber 23 by lines 45, 46, and manifold line 47 from which it is discharged. If a plurality of fixed beds constitute the cooling zone, the cooling medium will be removed from the first terminal bed of the cooling zone and introduced into the next, and so on, until it passes through the last terminal fixed bed of the cooling zone, from which it is discharged into manifold line 47.

The above description comprises one cycle of the invention shown by Figure 2. The next cycle would then be as follows. The hot reaction mixture would then be introduced through feed manifold line 28 and line 48 into chamber 21 and heat exchange mass 25, thereby making this latter fixed bed the first terminal fixed bed of the liquid phthalic anhydride recovery zone in the second cycle of operation. The same temperature gradient would be established in the liquid phthalic anhydride recovery zone as in cycle one, except that the withdrawal of liquid phthalic anhydride would be from chamber 22 instead of chamber 21, as in cycle one, and the last terminal fixed bed of the liquid phthalic anhydride recovery zone would then be chamber 23. The effluent from this last fixed bed would then be removed by line 49 and introduced into line 40 and then to fume disposal. In the second cycle, chamber 20 and mass 24 are cooled by the cooling medium entering chamber 20 by manifold line 43 and line 50, passing through mass 24, and leaving by lines 51, 52, and manifold line 47.

Further cycles are initiated in a similar manner. Table 1 indicates the distribution of the fixed beds into the liquid phthalic anhydride recovery zone and the cooling zone in successive cycles. Number references are to Figure 2.

TABLE 1

| Cycle No. | Liquid Phthalic Anhydride Recovery Zone (Mass No.) | Cooling Zone (Mass No.) |
| --- | --- | --- |
| 1 | 24, 25, 26 | 27 |
| 2 | 25, 26, 27 | 24 |
| 3 | 26, 27, 24 | 25 |
| 4 | 27, 24, 25 etc. | 26 |

The valve settings required to produce the flow patterns will be apparent to those skilled in the art. For example, the flow pattern as described in cycle one, above, in which the liquid phthalic anhydride recovery done is composed of chambers 20, 21, and 22, with the reaction mixture introduced into chamber 20 and with chamber 23 comprising the cooling zone, would have the following valve settings: At chamber 20, valve lines 29 and 34 are open. At chamber 21, valve lines 41 and 36 are open. At chamber 22, valve line 38 is open. At chamber 23, the cooling zone, as here described, valve lines 44 and 46 are open. All other valves will be closed.

Figure 3 of the appended drawings illustrates a further modification of the process of the invention by which liquid phthalic anhydride is recovered. The reaction mixture containing phthalic anhydride in such amounts that its partial pressure is less than the vapor pressure of liquid phthalic anhydride at its melting point is passed from an oxidation reactor into stationary chamber 60 through port 61. Inside chamber 60 is a segmented cylinder 62, rotating countercurrently to the flow of the reaction mixture on its axis and in a clockwise direction. Segmented cylinder 62 within chamber 60 is divided into a plurality of packed segments 63a to 63h and void segments 64a to 64h. The segments 63 are preferably packed with high melting solid granular heat exchange material and held in place by screens or the like. The size of the heat exchange material is preferably in the range from 1 to 5 mesh, i. e., from 1 inch in diameter to ⅕ inch in diameter, and is preferably free of internal adsorptive surface area, i. e., it is a non-porous, inert, high-melting solid such as quartz chips, granite pebbles, metal spheres, etc. The void area 64 between each of the packed segments 63 is divided by a baffle, 66a to 66h, in which is constructed one or more spring-loaded, poppet-type valves 67a to 67h to control gas flow in one direction only. On the periphery of the packed segments 63a to 63h and baffles 66a to 66h, gas seals 68 are located. These seals ride on the stationary shell 60 and prevent gas from leaking past the packed segments without passing through them.

The operation of the process of this invention, as illustrated in Figure 3, can be best explained by describing the conditions existing within chamber 60 prior to the introduction of the gaseous reaction mixture in this cycle. Due to the passage of the reaction mixture through the chamber 60 in previous cycles, a temperature gradient has been established as follows. Mass 63a has been rotated clockwise, meeting successively hotter reaction mixture gases. By the time it has arrived at the point shown on Figure 3, it is at a temperature approaching the inlet temperature of the reaction mixture, i. e., above about 400° F., and contains within it some phthalic anhydride in the form of both a liquid and vapor phase. Void segment 64a is at a somewhat lower temperature than mass 63a. Mass 63b is at a temperature of about 300° F. to 400° F., and phthalic anhydride is there, present in two phases, but the liquid phase there is in larger quantities than on mass 63a. Void 64b is at a still lower temperature. Mass 63c is at a still lower temperature and contains all three phases of phthalic anhydride, vapor, liquid, and solid. Void 64c is lower in temperature than mass 63c. Mass 63d is at a temperature less than the freeze point of phthalic anhydride, or preferably less than about 150° F., and phthalic anhydride exists in this mass only as a solid. Void 64d temperature is less than the freeze point of phthalic anhydride.

As noted before, the phthalic anhydride-containing gas is passed into chamber 60 through port 61. By means of the back pressure of the reaction mixture, the reaction product is forced into contact with the first packed segment 63a, the direction of flow being counterclockwise and the rotation of the segmented cylinder 62 being in a clockwise direction. The hot reaction mixture, in passing through mass 63a, vaporizes the liquid phthalic anhydride in the mass and thus is enriched in respect to the phthalic anhydride content. The enriched reaction mixture then passes through void segment 64a, poppet valve 67a in baffle 66a, and contacts mass 63b, where the liquid phthalic anhydride entrained in the mass is vaporized and further enriches the reaction mixture as it passes through the mass. In void segment 64b there is formed a liquid phase of phthalic anhydride, due to the continuing enrichment by vaporizing of the liquid phthalic anhydride and also by some sublimation of solid phthalic anhydride crystals formed in the cooler segments. The enriching process has so increased the phthalic anhydride content of the reaction product that in void segment 64b the phthalic anhydride dew point is above the melting point of phthalic anhydride, and, as the cooler bed 63c comes into contact with the vapor, condensation occurs and a liquid phthalic anhydride phase is condensed. This liquid phase of phthalic anhydride is then removed from chamber 60 at port 69. The gas phase passing through mass 63c passes through valve 67c in baffle 66c, and contacts mass 63d, where all or substantially all of the phthalic anhydride in the reaction product is deposited as a solid, since the temperature of segment 63d at this point is less than the melting point of phthalic anhydride. Gas substantially free of phthalic anhydride then passes through void 64d and is discharged from chamber 60 at port 70.

The section of chamber 60 between the inlet port 61 and the reaction mixture exit port 70 constitutes the liquid phthalic anhydride recovery zone.

The portion of chamber 60 above ports 61 and 70 constitutes the cooling zone. In this portion of chamber 60, cooled gas, either the effluent from port 70, further cooled by indirect heat exchange, or a separate cooling gas, is introduced into chamber 60 at port 71 so that the gas flow is in a counterclockwise direction. This cooling gas contacts the clockwise rotating packed segments 63, cools them by passing through the masses 63e, f, and g, and is ejected at port 72. The poppet valves 67 in baffles 66 will prevent the commingling of the reaction mixture product gas introduced at port 61 and removed at port 70, and the cooling gas introduced at port 71 and removed at port 72. This cooling gas in the top portion of chamber 60, where the elements are being cooled, is maintained throughout at a pressure slightly higher than the reaction mixture pressure in the lower portion or liquid phthalic anhydride recovery zone of the chamber 60, to prevent undesirable leakage of the reaction mixture gases containing phthalic anhydride past the gas seals 68 and into the cooling zone, where it would be discharged through port 72 with a loss of phthalic anhydride.

The above description of the operation of the process of the invention, as illustrated by Figure 3, shows a total of eight packed segments, but it is understood that the invention is not so limited in number, and that a plurality of packed segments is within the scope of this invention.

The following example illustrates the operation of this invention pursuant to the process shown in Figure 2.

*Example*

The following equipment was utilized in performing the invention: Four mild steel columns of 2 inches in diameter by 2 feet in length; all manifolds and valves of ½ inch; four mesh screen supports; a primary insulation of ⅝ inch asbestos upon which the heaters are wound; secondary insulation consisting of a magnesia-filled box surrounding the entire equipment; six 750-watt heaters, four on the columns, one on the gas inlet, and one on the liquid draw-offs; radial thermowells with thermocouples at the top and the bottom of the packing; air cooling gas; a wet test meter for final gas measurement; four pressure taps at the inlet to each column; and packing as follows: one column filled with ¼ inch Alundum heat exchange spheres, one column of −3 to 5 mesh gravel, one column of −4 to +7 mesh quartz, and one column of ¼ inch Berl stoneware saddles. The reaction mixture fed to the oxidation zone had an average weight ratio of air to hydrocarbon (o-xylene) of 28 to 1. The temperature at the inlet to the first terminal packed bed of the liquid phthalic anhydride recovery zone was from 500° F. to 600° F. The outlet temperature from the last terminal packed bed of the liquid recovery zone was a maximum of 155° F. The total volume of reaction mixture product gas fed was 2556 cu. ft. An average recovery of phthalic anhydride in the liquid phase of 99.5% of the total phthalic anhydride content of the reaction mixture was obtained. To determine the loss of phthalic anhydride, samples of the exit gas were metered through a wet filter of 2-inch glass wool filtering fiber at normal velocities, the sample was then dissolved in acetone and titrated with potassium permanganate and caustic. A loss range of phthalic anhydride from 1.5 to 0.0% was found. Further evidence of low phthalic anhydride loss through the exit gas was the fact that the exit lines were relatively clean after forty hours of operation.

When a new cycle is initiated, i. e., the first terminal packed bed of the liquid phthalic anhydride recovery zone of the previous cycle becomes a packed bed of the cooling zone, the packing contains reaction mixture gas with phthalic anhydride in it. If this gas is displaced by the cooling gas and the phthalic anhydride lost, the overall phthalic anhydride loss would be about 0.15%. This gas is desirably purged to the process stream with recovery to reduce phthalic anhydride loss.

The rates in the example were limited to 100 cu. ft. per hour, which is equivalent to 1.67 cu. ft. per minute. Actual average rates were about 1.1 cu. ft. per minute, but rates can be increased appreciably without loss of efficiency. No serious pressure drop losses were encountered; however, the pressure drop increased slowly in the packed bed in which the liquid phase was formed, but upon removing portions of the liquid phthalic anhydride, the pressure drop considerably lessened.

The cooling gas employed in the cooling zone in this example was air.

As performed in this example, all gaseous streams were introduced at the top of the packed beds, so that downflow through the beds resulted. The heat exchange material in the beds was heated progressively from the top, and the liquid phthalic anhydride drains from the top to the cooler packing and solidifies. Unless the column is long, however, the liquid drains from the bottom before any appreciable plugging occurs.

The crude oxidation reaction product effluent from the oxidation reactor contains, in addition to phthalic anhydride, a small proportion of maleic anhydride and a small proportion of heavy side reaction products. The reaction mixture effluent from the phthalic anhydride recovery zones in each modification of the process of the invention, as described heretofore, is substantially free of phthalic anhydride, but the maleic anhydride and heavy side reaction products still remain in substantial amounts. In the above descriptions of the various modifications of the process of the invention, it was noted that this phthalic anhydride-free effluent from the recovery zones could be further cooled by direct or indirect heat exchange and then used as the cooling gas in the cooling stages. In each of the modifications of the invention above described, the effluent from the phthalic anhydride recovery zone may be passed through a water scrubber, thereby removing the maleic anhydride from the effluent and simultaneously cooling the gas to a temperature sufficiently low that it can be charged to the cooling zone as cooling gas.

The process of the invention here described offers the following advantages over present commercial processes:

(1) A dehydrated liquid phthalic anhydride product is obtained, thereby avoiding the solids handling and dehydration problems.

(2) The liquid phthalic anhydride is low in maleic content, thereby increasing the distillation yield and improving product quality.

(3) Waste heat is recovered.

(4) The process is continuous, flexible, and results in high yields of phthalic anhydride.

I claim:

1. The process of recovering phthalic anhydride from a hot mixture of normally gaseous components having a low content of phthalic anhydride such that solid phthalic anhydride is condensed from it on normal cooling, which comprises introducing the hot mixture into contact with initially cool particulate solid heat exchange material, the particles of said material being relatively immovable with respect to the dimensional boundaries of said material, continuing the contact of the mixture and heat exchange material until there is established a temperature gradient in said material having a higher limit at about the temperature of the hot gaseous mixture at the point at which the hot mixture is introduced and a lower limit downstream from said point of introduction having a temperature below the melting point of phthalic anhydride, withdrawing phthalic anhydride from said contact material at a point where the temperature is intermediate the limits of the said temperature gradient, and withdrawing normally gaseous components of the mixture substantially free of phthalic anhydride from the said contact material at a point adjacent the lower limit of the said temperature gradient.

2. The process of recovering liquid phthalic anhydride from a hot gaseous mixture having a low content of phthalic anhydride such that solid phthalic anhydride is condensed from it on normal cooling, which comprises introducing said mixture at a temperature in the range about 270° F. to 1000° F. into one extremity of a cool fixed mass of initially cool particulate solid heat exchange material, the particles of said material being relatively immovable with respect to the dimensional boundaries of said material, withdrawing at the other extremity of said fixed mass normally gaseous components of the mixture substantially free of phthalic anhydride, continuing passage of the mixture through said fixed mass until there is established in said mass a temperature gradient ranging from that of the gaseous mixture at the point of introduction of said mixture into said mass to a temperature less than the melting point of phthalic anhydride at the point of withdrawal of said gaseous mixture from said mass, withdrawing phthalic anhydride-enriched vapor from said mass at a point intermediate the point of introduction of the gaseous mixture and the point of withdrawal of the phthalic anhydride-free gaseous mixture, and cooling said enriched phthalic anhydride vapor withdrawn from said intermediate point to condense liquid phthalic anhydride, cooling said mass below about 125° F., and then introducing fresh hot gaseous mixture having a low content of phthalic anhydride such that solid phthalic anhydride is condensed from it on normal cooling.

3. The process of recovering liquid phthalic anhydride from a gaseous mixture having a low content of phthalic anhydride such that solid phthalic anhydride is condensed from it on normal cooling, which comprises a series of cycles, each cycle comprised of four steps as hereinafter described; in the first step, said gaseous mixture is introduced at a temperature in the range about 270° F. to 1000° F. into one extremity of a cool fixed mass of initially cool particulate solid heat exchange material, the particles of said material being relatively immovable with respect to the dimensional boundaries of said material, and withdrawing normally gaseous components of the mixture substantially free of phthalic anhydride from the other extremity of said mass, continuing passage of the gaseous mixture through said mass only until there is established in said mass a temperature gradient ranging from a temperature approximately equal to that of the gaseous mixture at the point of introduction to a temperature less than the melting point of phthalic anhydride at the point of withdrawal of said gaseous mixture from said mass, withdrawing phthalic anhydride-enriched vapor from said mass at a point intermediate the point of introduction of the gaseous reaction mixture and the point of withdrawal of the phthalic anhydride-free gaseous mixture, and cooling and condensing extrinsically with respect to said mass said enriched phthalic anhydride vapor withdrawn from said intermediate point to liquid phthalic anhydride; in the second step, introduction of the phthalic anhydride-containing gaseous mixture is halted, and said mass is cooled to a temperature below about 125° F.; in the third step, step one is repeated, but with the phthalic anhydride-containing gaseous mixture traversing the mass in a direction opposite to that of step one; and in the fourth step, step two is repeated.

4. The process of recovering liquid phthalic anhydride from a gaseous mixture having a low content of phthalic anhydride such that solid phthalic anhydride is condensed from it on normal cooling, which comprises a series of cycles, each cycle comprised of four steps, as hereinafter described; in the first step, said gaseous mixture is introduced at a temperature in the range 270° F. to 1000° F. into one extremity of a cool fixed mass of initially cool particulate solid heat exchange material, the particles of said material being relatively immovable with respect to the dimensional boundaries of said material, and withdrawing normally gaseous components of the mixture substantially free of phthalic anhydride from the other extremity of said mass, continuing passage of the gaseous mixture through said mass only until there is established in said mass a temperature gradient ranging from a temperature approximately equal to that of the gaseous mixture at the point of introduction to a temperature less than the melting point of phthalic anhydride at the point of withdrawal of said gaseous mixture from said mass, withdrawing liquid phthalic anhydride from said mass at a point intermediate the point of introduction of the gaseous mixture and the point of withdrawal of the phthalic anhydride-free gaseous mixture; in the second step, introduction of the phthalic anhydride-containing gaseous mixture is halted and said mass is cooled to a temperature below about 125° F.; in the third step, step one is repeated, but with the phthalic anhydride-containing gaseous mixture traversing the mass in a direction opposite to that of step one; and in the fourth step, step two is repeated.

5. The method of recovering liquid phthalic anhydride from a gaseous mixture having a low content of phthalic anhydride such that solid phthalic anhydride is condensed from it on normal cooling, which comprises maintaining a group of serially interconnected fixed beds of initially cool particulate solid heat exchange material, the particles of said material being relatively immovable with respect to the dimensional boundaries of said material, said beds constituting a liquid phthalic anhydride recovery zone and a cooling zone, introducing said gaseous mixture at a temperature in the range of 270° F. to 1000° F. into the first of the serially connected fixed beds of the liquid phthalic anhydride recovery zone during each cycle, continuing the gaseous mixture introduction to said first fixed bed only until there is established in said liquid phthalic anhydride recovery zone a temperature gradient ranging from approximately that of the gaseous mixture at the point of introduction to said first terminal fixed bed to a temperature less than the melting point of phthalic anhydride in the last terminal fixed bed of the liquid phthalic anhydride recovery zone, withdrawing liquid phthalic anhydride from one or more of the intermediate fixed beds of heat exchange material constituting the recovery zone, withdrawing from the last terminal fixed bed of the liquid phthalic anhydride recovery zone a gaseous effluent substantially free of phthalic anhydride and at a temperature less than the melting point of phthalic anhydride, passing a cold gas through the cooling zone, and withdrawing from the last terminal fixed bed of the cooling zone a warm effluent of substantially phthalic anhydride-free gas, and initiating successive cycles by moving the points of gaseous mixture introduction in each of said zones to the next serially connected fixed bed in the direction of flow and regrouping the fixed beds so that the first terminal fixed beds in the liquid phthalic anhydride recovery zone and cooling zone during one cycle become the last terminal fixed beds in the liquid phthalic anhydride recovery zone and cooling zone, respectively, in the succeeding cycle.

6. A process of recovering phthalic anhydride from a gaseous mixture in which phthalic anhydride is present in such amounts that its partial pressure is less than the vapor pressure of said liquid phthalic anhydride below its melting point, which comprises introducing the gaseous mixture at a temperature in the range of 270° F. to 1000° F. into one extremity of a recovery zone comprised of a plurality of masses of initially cool particulate solid heat exchange material, the particles of said material being relatively immovable with respect to the dimensional boundaries of said material, rotating said masses within said recovery zone in a path countercurrent to the flow of said gaseous mixture until there is established a temperature gradient in said recovery zone having a higher limit at about the temperature of the hot gaseous mixture at the point at which the gaseous mixture is introduced into one extremity of said recovery zone and a lower limit at the other extremity of said recovery zone having a temperature below the melting point of phthalic anhydride, withdrawing cooled gas substantially free of phthalic anhydride from said other extremity of the recovery zone, and withdrawing liquid phthalic anhydride from the recovery zone at a point where the temperature is intermediate the limits of the said temperature gradient.

7. A process for recovering liquid phthalic anhydride from a hot gaseous mixture having a low content of phthalic anhydride such that solid phthalic anhydride is condensed from it on normal cooling, which comprises continuously rotating a plurality of beds of initially cool particulate solid heat exchange material, the particles of said material being relatively immovable with respect to the dimensional boundaries of said material in an approximately circular path through a phthalic anhydride recovery zone and a cooling zone until there is established a temperature gradient in said recovery zone having a higher limit at about the temperature of the hot gaseous mixture at the point at which the gaseous mixture is introduced into one extremity of said recovery zone and a lower limit at the other extremity of said recovery zone having a temperature below the melting point of phthalic anhydride, withdrawing phthalic anhydride free gas from said other extremity of the recovery zone, and withdrawing liquid phthalic anhydride from the recovery zone at a point where the temperature is intermediate the limits of the said temperature gradient, introducing a cooling gas into one extremity of the cooling zone and countercurrently contacting it with the beds moving through a cooling zone, and withdrawing spent cooling gas from the other extremity of the cooling zone.

8. The process of recovering liquid phthalic anhydride from a gaseous mixture having a low content of phthalic anhydride such that solid phthalic anhydride is condensed from it on normal cooling, which comprises introducing the gaseous mixture at a temperature in the range of 270° F. to 1000° F. into a chamber containing a segmented cylinder, said segmented cylinder being divided into a plurality of segments packed with initially cool particulate solid heat exchange material, the particles of said material being relatively immovable with respect to the dimensional boundaries of said material, and a plurality of void segments, rotating said packed segments in a path countercurrent to the flow of said gaseous reaction mixture until there is established a temperature gradient in said chamber having a higher limit at about the temperature of the gaseous mixture at the point at which the gaseous mixture is introduced and a lower limit downstream from said point of introduction having a temperature below the melting point of phthalic anhydride, withdrawing the gaseous mixture substantially free of phthalic anhydride from the said chamber at a point adjacent the lower limit of the said temperature gradient, withdrawing phthalic anhydride from said chamber at a point where the temperature is intermediate the limits of the said temperature gradient, introducing into said chamber a cooling gas to cool the hot packed segments of said segmented cylinder, and withdrawing from said chamber the cooling gas after it has cooled the packed segments of said segmented cylinder.

9. A cyclic process for recovering liquid phthalic anhydride from gaseous mixtures having low contents of phthalic anhydride such that solid phthalic anhydride is condensed from the mixtures on normal cooling, each cycle comprising the steps of passing the hot gaseous mixture into one extremity of a fixed bed of initially cool particulate solid heat exchange material, the particles of said material being relatively immovable with respect to the dimensional boundaries of said material, and withdrawing the normally gaseous components of the mixture substantially free of phthalic anhydride from the other extremity of the bed, continuing passage of the gaseous mixture through said bed until there is established in the bed a temperature gradient ranging from a temperature approximately equal to that of the gaseous mixture adjacent the inlet extremity of the bed to a temperature below the melting point of phthalic anhydride adjacent the outlet extremity of the bed, withdrawing gas enriched in phthalic anhydride content from the bed at a point intermediate the inlet and the outlet of the bed and cooling the enriched gas to condense liquid phthalic anhydride, discontinuing the introduction of the gaseous mixture into the bed and passing a cooling gas through the bed in the same direction as that followed by the gaseous mixture, continuing passage of the cooling gas through the bed until the temperature of the entire bed of heat exchange material is reduced to a temperature below about 125° F. to complete the cycle, and conducting successive cycles by passing the gaseous mixture and the cooling gas through the bed in the direction opposite that employed in the immediately preceding cycle.

References Cited in the file of this patent

UNITED STATES PATENTS

| | | |
|---|---|---|
| 2,455,314 | Pietzsch | Nov. 30, 1948 |
| 2,580,635 | Winter | Jan. 1, 1952 |
| 2,583,013 | Patterson | Jan. 22, 1952 |
| 2,607,440 | Lewis | Aug. 19, 1952 |
| 2,702,091 | Smith | Feb. 15, 1956 |